United States Patent [19]
Davis

[11] Patent Number: 5,408,978
[45] Date of Patent: Apr. 25, 1995

[54] GASEOUS FUEL ENTRAINMENT APPARATUS AND PROCESS

[75] Inventor: Robby E. Davis, Riverdale, Ga.

[73] Assignee: Davis Family Trust, Atlanta, Ga.

[21] Appl. No.: 56,834

[22] Filed: May 3, 1993

[51] Int. Cl.6 .......................................... F02M 21/04
[52] U.S. Cl. ..................................... 123/527; 123/528
[58] Field of Search ................... 123/527, 528; 48/144, 48/180.1

[56] References Cited

U.S. PATENT DOCUMENTS

| 2,233,523 | 3/1941 | Forgar | 48/180 |
|---|---|---|---|
| 2,992,084 | 7/1961 | Schropp | 48/180 |
| 3,577,726 | 5/1971 | Wagner | 123/528 |
| 3,843,338 | 10/1974 | Zonker et al. | 123/527 |
| 4,278,064 | 7/1981 | Regueiro | 123/577 |
| 4,387,689 | 6/1983 | Brown | 123/525 |
| 4,398,521 | 8/1983 | Schuurman | 123/527 |
| 4,399,795 | 8/1983 | Brown | 123/527 |
| 4,425,140 | 1/1984 | Lassanske et al. | 48/180 |
| 4,425,898 | 1/1984 | McLean | 123/527 |
| 4,463,734 | 8/1984 | Akeroyd | 123/525 |
| 4,479,466 | 10/1984 | Greenway et al. | 123/527 |
| 4,494,515 | 1/1985 | Brown | 123/527 |
| 4,497,304 | 2/1985 | Wintrell et al. | 123/527 |
| 4,505,249 | 3/1985 | Young | 123/527 |
| 4,520,766 | 6/1985 | Akeroyd | 123/27 GE |
| 4,553,523 | 11/1985 | Stohrer, Jr. | 126/9 B |
| 4,603,674 | 8/1986 | Tanaka | 123/575 |
| 4,617,904 | 10/1986 | Pagdin | 123/527 |
| 4,641,625 | 2/1987 | Smith | 123/575 |
| 4,708,094 | 11/1987 | Helmich et al. | 123/27 GE |
| 4,769,995 | 9/1988 | Serve | 123/528 |
| 4,817,568 | 4/1989 | Bedford | 123/431 |
| 4,829,957 | 5/1989 | Garretson et al. | 123/27 GE |
| 4,831,993 | 5/1989 | Kelgard | 123/525 |
| 4,872,440 | 10/1989 | Green | 123/590 |
| 4,953,516 | 9/1990 | van der Weide | 123/527 |
| 4,955,326 | 9/1990 | Helmich | 123/27 GE |
| 4,991,561 | 2/1991 | Gerassimov | 123/527 |
| 5,058,625 | 10/1991 | Kaiser et al. | 123/527 |
| 5,083,547 | 1/1992 | Davis | 123/527 |
| 5,092,305 | 3/1992 | King | 123/575 |
| 5,103,795 | 4/1992 | Davis | 123/527 |
| 5,136,986 | 8/1992 | Jensen | 123/27 GE |
| 5,203,305 | 4/1993 | Porter et al. | 123/527 |
| 5,237,981 | 8/1993 | Polletta et al. | 123/527 |

FOREIGN PATENT DOCUMENTS 1285177  1/1987  U.S.S.R. .................................. 123/527

Primary Examiner—Willis R. Wolfe
Assistant Examiner—Erick Solis
Attorney, Agent, or Firm—Kennedy & Kennedy

[57] ABSTRACT

A mixer (10) for entraining gaseous fuel into an airstream for induction into an internal combustion engine (12) having a turbocharger (13). The mixer has a housing (16) mounted to a conduit (14) between the turbocharger and the engine. The mixer also has a control ring (32) mounted to the housing that has an annular array of holes (39) through which gaseous fuel, from a supply of gaseous fuel coupled to the housing, is introduced into the airstream passing through the mixer and into the engine.

5 Claims, 4 Drawing Sheets

GASEOUS FUEL ENTRAINMENT APPARATUS AND PROCESS

TECHNICAL FIELD

This invention relates to apparatuses for introducing a mixture of air and gaseous fuel into internal combustion engines and to processes for doing such.

BACKGROUND OF THE INVENTION

The air pollution problems inherent in the operation of gasoline fueled and diesel oil fueled internal combustion engines are well known. For this reason various emission control devices are presently in use, and indeed are often required by governmental regulations, to reduce the amount of pollutants discharged into the atmosphere by internal combustion engines. These emission control devices, however, only remove a portion of the pollutants and are subject to deterioration with the passage of time. Also, they often hinder engines from operating at peak efficiencies.

Natural gas is today sometimes used as a substitute fuel for gasoline and diesel oil. It has the capability of producing less combustion pollutants and for decreasing engine operating costs without complex emission control devices. Obviously, its expanded use would also reduce the rate of world fossil fuel consumption.

As the transportation infrastructure of today does not include large numbers of widely disbursed retail suppliers of natural gas for vehicles in many countries, it is not practical to produce vehicles that are fueled solely by gaseous fuels like natural gas due to range limitations. To evolve towards such it is more practical to equip vehicles to operate with a supply of both a liquid fuel such as gasoline or diesel fuel and a supply of gaseous fuel such as natural gas. To do that efficiently it is desirable that as little retrofitting be required as possible to existing fuel intake systems and configurations.

To this end devices have been developed for mixing natural gas and air for introduction into engines. Often these are in the form of conversion kits for installation onto carburetors. These kits convert the engine to a dual fuel system that permits operation on liquid fuel alone, on gaseous fuel alone, and in some systems on combinations of the two.

One type of such a kit includes a gaseous dispensing device mounted within an intake conduit that funnels air to the engine air filter. Exemplary of this type is that shown in U.S. Pat. No. 4,495,515. A problem associated with this type of kit is that original automobile parts must be substantially modified in order to accommodate it. Once these modifications are made the modified part must be replaced or repaired should the device be removed. Another problem associated with it is that the proper air to gas mixture is achieved through limiting the flow of gaseous fuel passing through the device into the engine air stream. This limitation results in limiting gas consumption rate throughout the entire range of gas flow rate needs.

Another type of conversion kit achieves a proper mixture of gas and air by limiting the amount of air entering the carburetor. The mixture is adjusted by increasing or decreasing air flow by typically providing a movable plate which limits the spacing through which air entering the engine may flow. The limitation of air however decreases the performance of the engine. Exemplary of these types of devices are those shown in U.S. Pat. Nos. 4,425,140, 4,425,898, and 4,387,689. Once again, these devices require substantial modifications to be made to conventional parts of the automobile engine.

Yet another type of conversion kit dispenses gas by creating a low pressure within a mixing device which causes gaseous fuel to be drawn into the airstream passing therethrough. The mixture of gas and air is adjusted by increasing or decreasing the aperture through which the gas is drawn. Exemplary of these types of devices are those shown in U.S. Pat. Nos. 5,083,547 and 5,103,795. However, today many automobiles are equipped with air-to-air cooled turbochargers which pressurize air that is then conveyed through long conduits to a radiators which cool the air prior to entering the engine. Because of the danger of rupturing these long conduits it would be extremely dangerous to mix gas with air into a combustible mixture prior to turbocharging. Also, since these devices operate at or about atmospheric pressure the pressure created by the turbocharger would make mounting these mixers downstream of the turbochargers ineffective. However, it would be highly desirable to enable a mixing device to work in conjunction with a turbocharger to attain the advantages of high performance and fuel efficiencies associated with turbocharged engines.

It thus is seen that an apparatus and process for mixing gaseous fuel and air together for introduction into a turbocharged internal combustion engine has long remained an elusive goal. Accordingly, it is to the provision of such that the present invention is primarily directed.

SUMMARY OF THE INVENTION

In a preferred form of the invention, apparatus for entraining gaseous fuel into an airstream for introduction into the intake port of an internal combustion engine. The apparatus comprises a housing having a tubular wall with a tubular plenum therein bounding an airstream channel. The tubular wall has an annular array of orifices in fluid communication with the airstream channel and the plenum. The housing also has a channel block that has a gaseous fuel channel therethrough in fluid communication with the plenum. The apparatus also has fuel control means mounted within the gaseous fuel channel for controlling the flow of gaseous fuel therethrough, and means for mounting the housing to the intake port. With this construction gaseous fuel introduced into the plenum is passed through the annular array of orifices into an airstream passing through the airstream channel and entrained therein.

In another preferred form of the invention, a fuel control system for use in entraining gaseous fuel into an internal combustion engine for ignition comprises, in combination, an air-to-air cooled turbocharger, conduit means for conveying an airstream from the turbocharger into the internal combustion engine, an air/fuel entraining means for entraining gaseous fuel with the airstream conveyed through the conduit means, a high pressure gaseous fuel cell, gaseous fuel conduit means for conveying gaseous fuel from the fuel cell to the entraining means, and fuel metering means for metering the flow of gaseous fuel through the gaseous fuel conduit means. With this system gaseous fuel may be entrained into the turbocharged airstream passing into the engine by introducing it at a pressure greater than that of the turbocharged airstream and at a position along the conduit means which minimizes the danger resulting from the possible rupture of the conduit means.

In another preferred form of the invention, a method of injecting gaseous fuel into an internal combustion engine for ignition comprises the steps of turbocharging an airstream to pressure levels, introducing fuel in a gaseous state at a pressure level greater than that of the turbocharged airstream, and conveying the turbocharged airstream and entrained fuel into the engine.

DETAILED DESCRIPTION

Figure 1:
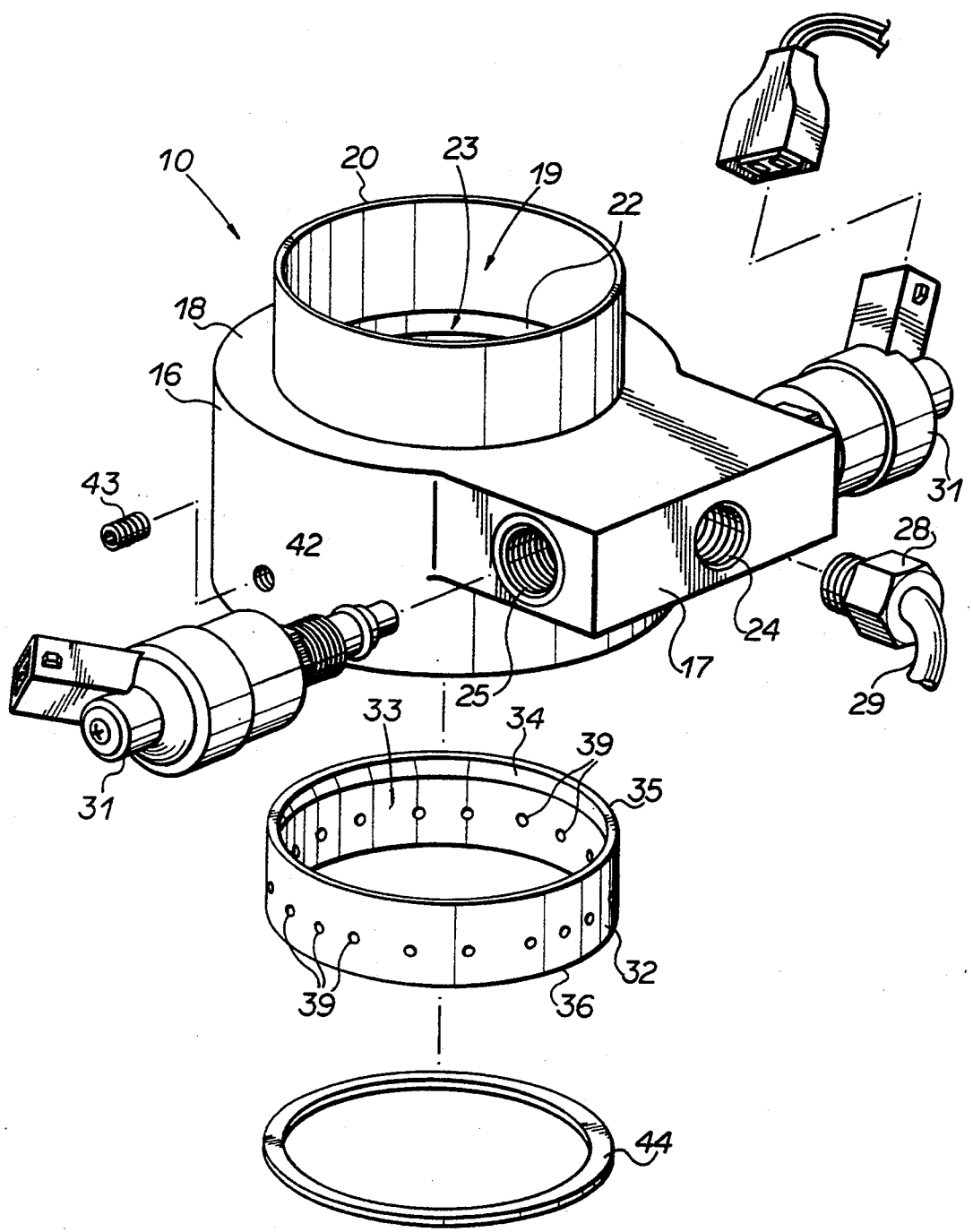
FIG. 1 is an exploded view of apparatus embodying principles of the present invention in a preferred form.
Figure 2:
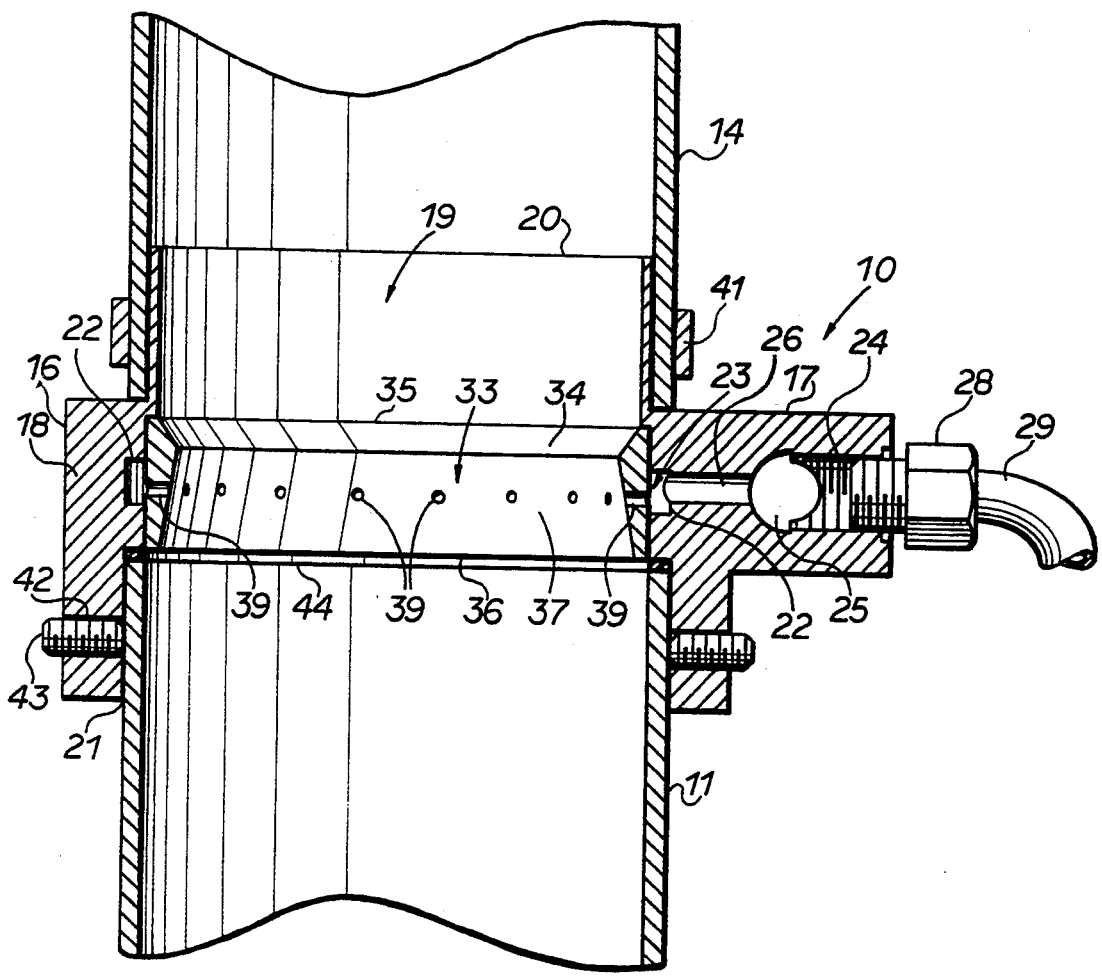
FIG. 2 is a cross-sectional side view of the apparatus of FIG. 1 shown in an assembled configuration.
Figure 3:
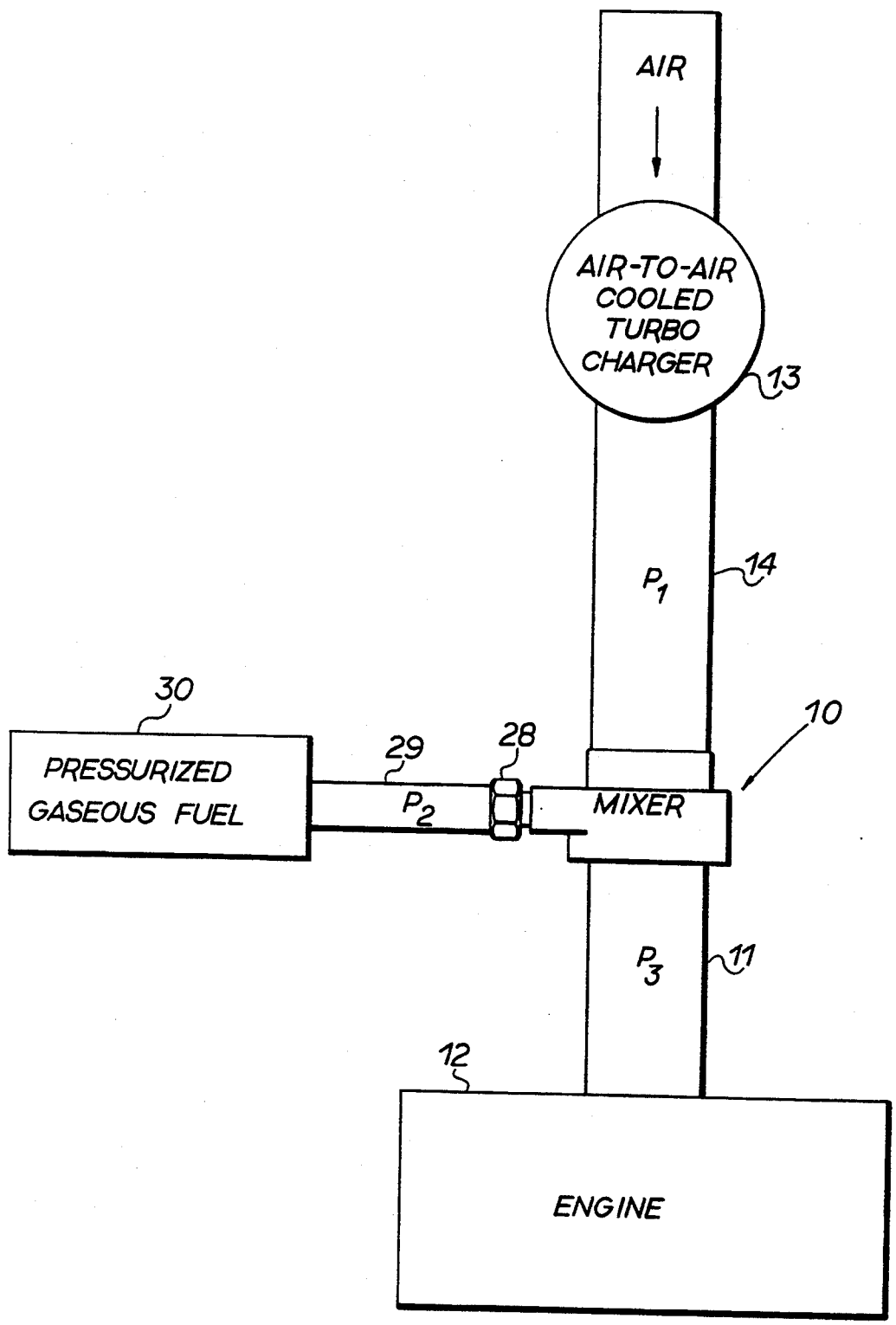
FIG. 3 is a schematic diagram of a system embodying principles of the present invention.

With reference next to the drawing, there is shown an apparatus or mixer 10 for introducing gaseous fuel, such as natural gas or propane, and air into an intake port 11 of a conventional internal combustion engine 12. The mixer is mounted on the inlet end of the intake port. An air-to-air cooled turbocharger 13 is mounted in fluid communication with the mixer 10 by a conduit 14. The mixer 10 has a housing 16 having a channel block 17 and a tubular wall 18 having a channel 19 extending therethrough from a top opening 20 and to a bottom opening 21. The tubular wall 18 has an annular groove 22 which partially defines a plenum 23. The channel block 17 has an internally threaded gas intake orifice 24, two control valve orifices 25 in fluid communication with the gas intake orifice 24, and two passages 26 in fluid communication with the plenum 23 and the control valve orifices 25. For small engines only one control valve may be used with the other control valve orifice blocked with a threaded cap. A coupler 28 on the end of a gaseous fuel supply line 29 that is coupled to a pressurized gaseous fuel cell 30 is mounted within the gas intake orifice 24 through which gaseous fuel may be fed to the plenum 23. Two electrically controlled control valves 31 are mounted within the control valve orifices 25 to control the flow of gaseous fuel through passages 26.

The mixer 10 also has a control ring 31 which is press fitted through the bottom opening 21 of the housing. The ring 32 has an inside wall 33 that has a taper which extends to one ring end 35 and a second taper 37 that extends to end 36. It also has an annular array of holes 39 therethrough to provide fluid communication between the plenum 23 and the channel 19.

The mixer 10 also has a mounting bracket 41 and a set of threaded holes 42 extending through the tubular wall 18 in which mounting screws 43 are threaded. A flexible, sealing washer 44 is positioned between the mixer 10 and the intake port 11 of the engine.

The mixer 10 may be easily mounted to an existing automobile engine so that the engine may be fueled by a gaseous fuel only or by conventional liquid fuel that is supplied by another, unshown fuel line to for example a carburetor. This is done by mounting the control ring 32 within channel 19, the control ring having a preselected number and size of holes for that particular engine. The mixer is then mounted to the intake port 11 of the engine by passing the intake port through the bottom opening 21 and securing it in place against washer 44 with mounting screws 43. Conduit 14 is then coupled to the top of the tubular wall 18 and secured in place by mounting bracket 41. It should be understood that the term intake port may be used to refer to the top portion of a carburetor, a fuel injection system, an intake manifold or simply a portion of conduit 14.

Figure 4:
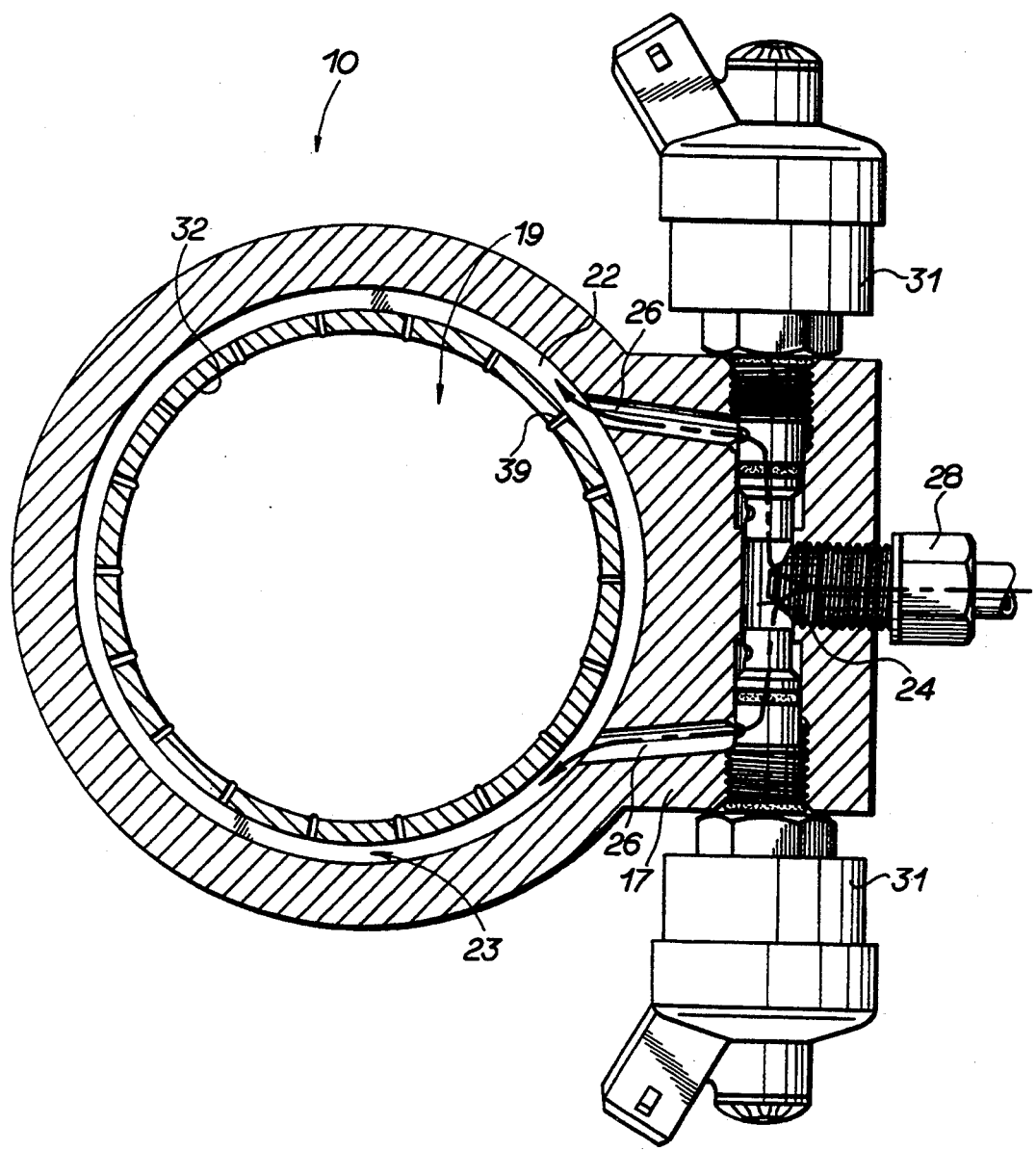
FIG. 4 is a cross-sectional top view of the apparatus of FIG. 1 shown in an assembled configuration.

In operation, the turbocharger 13 pressurizes the air forced into the engine through conduit 14. As this occurs gaseous fuel flowing from the pressurized fuel cell 30 is reduced by a conventional pressure regulator to approximately 100 psi greater than the air pressure created by turbocharger 13, which typically may reach a maximum of 30 psi. As shown in FIG. 4 with arrows, the gaseous fuel passes through the fuel line 29 and into the gas intake orifice 24. The control valves 31 controls the flow of gaseous fuel passing through passages 26 into plenum 23 by opening a passage through each valve for a selected period of time. The longer the passage is opened the more fuel will flow through the valves and the more power will be developed by the engine. The operation of the control valves 31 is electrically controlled through the conventional fuel metering controller, commonly referred to as the on-board computer. The control valves 31 are mounted closely adjacent the plenum 23 to minimize the lag time between the control valves actuation and the resulting quantity of gaseous fuel being taken into the engine.

The control ring interior tapers 33 and 37 produce a swirling, eddying-type flow of the air that passes through channel 19 which causes the gaseous fuel to mix thoroughly with it. For added insurance that the gaseous fuel is thoroughly mixed with the airstream, the control ring holes 39 are oriented substantially normal to the airstream so that as the gaseous fuel is expelled therefrom under pressure and becomes thoroughly dispersed and entrained with the airstream rather than being entrained just along the periphery of the airstream.

From the foregoing it is seen that air and fuel mixer is now provided which overcomes problems associated with those of the prior art. It should however be understood that the just described embodiment merely illustrates principles of the invention in a preferred form. Many modifications, additions and deletions may, of course, be made without departure from the spirit and scope of the invention as set forth in the following claims.

I claim:

1. Apparatus for entraining gaseous fuel into an airstream for introduction into the intake port of an internal combustion engine, and with the apparatus comprising a housing having a tubular wall with a tubular plenum therein bounding an airstream channel, said tubular wall having an annular array of orifices in fluid communication with said airstream channel and said plenum and a removable, annular, hollow ring through which said orifices extend, said housing also having a channel block having a gaseous fuel channel therethrough in fluid communication with said plenum; fuel control means mounted within said gaseous fuel channel for controlling the flow of gaseous fuel therethrough; and means for mounting said housing to the intake port, whereby gaseous fuel introduced into the plenum is passed through the annular array of orifices into an airstream passing through the airstream channel and entrained therein.

2. Apparatus for entraining gaseous fuel into an airstream for introduction into the intake port of an internal combustion engine, and with the apparatus comprising a housing having a tubular wall with a tubular plenum therein bounding an airstream channel, said tubular wall having an annular array of orifices in fluid communication with said airstream channel and said plenum, said housing also having a channel block having a plurality of gaseous fuel channels therethrough in fluid communication with and between a supply of gaseous fuel and said plenum; fuel control means mounted within said gaseous fuel channel for controlling the flow of gaseous fuel therethrough; and means for mounting said housing to the intake port, whereby gaseous fuel introduced into the plenum is passed through the annular array of orifices into an airstream passing through the airstream channel and entrained therein.

3. A fuel control system for use in entraining gaseous fuel into an internal combustion engine for ignition comprising, in combination, an air-to-air cooled turbocharger;

conduit means for conveying an airstream from said turbocharger into the internal combustion engine;

an air/fuel entraining means coupled to said conduit means for entraining gaseous fuel with the airstream conveyed through said conduit means;

a high pressure gaseous fuel cell;

gaseous fuel conduit means for conveying gaseous fuel from said fuel cell to said entraining means; and fuel metering means for metering the flow of gaseous fuel through said gaseous fuel conduit means;

whereby gaseous fuel may be entrained into the turbocharged airstream passing into the engine by introducing it at a pressure greater than that of the turbocharged airstream and at a position along the conduit means which minimizes the danger resulting from the possible rupture of the conduit means.

4. The fuel control system of claim 3 wherein said fuel metering means meters the flow of gaseous fuel closely adjacent said mixing means.

5. The fuel control system of claim 3 wherein said mixing means comprises a housing having a channel therethrough, an annular plenum and an annular array of orifices in fluid communication with said channel and said plenum through which the gaseous fuel is injected into air passing through said channel.

* * * * *